(12) United States Patent
Chou

(10) Patent No.: US 8,248,717 B2
(45) Date of Patent: Aug. 21, 2012

(54) CAMERA MODULE

(75) Inventor: Yuan-Hsu Chou, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 168 days.

(21) Appl. No.: 12/699,998

(22) Filed: Feb. 4, 2010

(65) Prior Publication Data

US 2011/0013295 A1 Jan. 20, 2011

(30) Foreign Application Priority Data

Jul. 20, 2009 (CN) .......................... 2009 1 0304525

(51) Int. Cl.
*G02B 7/02* (2006.01)

(52) U.S. Cl. .................. 359/819; 359/811; 359/827

(58) Field of Classification Search .................. 359/808, 359/819, 827
See application file for complete search history.

(56) References Cited

U.S. PATENT DOCUMENTS

| 7,542,220 B2 * | 6/2009 | Chan .............................. 359/811 |
| 2003/0007260 A1 | 1/2003 | Kogaku |
| 2007/0280667 A1 | 12/2007 | Shin |

FOREIGN PATENT DOCUMENTS

| CN | 2736790 Y | 10/2005 |
| CN | 101174019 A | 5/2008 |
| CN | 201083868 Y | 7/2008 |
| CN | 101303444 A | 11/2008 |
| CN | 101359079 A | 2/2009 |
| CN | 101431609 A | 5/2009 |
| TW | M350036 U | 2/2009 |

* cited by examiner

*Primary Examiner* — Ricky Mack
*Assistant Examiner* — Mahidere Sahle
(74) *Attorney, Agent, or Firm* — Altis Law Group, Inc.

(57) ABSTRACT

An exemplary camera module includes a lens holder and a lens barrel. The lens holder includes a cylindrical receiving cavity defined therein and an inner smooth surface in the cylindrical receiving cavity. The lens barrel is received in the cylindrical receiving cavity. The lens barrel includes a hollow cylinder and a plurality of spaced protrusions arranged on the outer cylindrical surface of the hollow cylinder. The outer cylindrical surface is spaced from the inner smooth surface. The protrusions abut against the inner smooth surface.

19 Claims, 3 Drawing Sheets

CAMERA MODULE

BACKGROUND

1. Technical Field

The present disclosure relates to optical imaging and, particularly, to a camera module.

2. Description of Related Art

Generally, a camera module includes a lens barrel, a plurality of optical elements (e.g., lenses, and infrared-cut filters) received in the barrel, and an image sensor mounted on a circuit board. In assembly, the optical elements are assembled into the barrel. Sometimes, the optical members are not properly aligned with the image sensor, pictures produced by the camera module will be misaligned and some parts may be out of focus. Accordingly, the imaging quality of the assembled camera module fails to reach a set standard.

Therefore, a new camera module is desired to overcome the above-mentioned problems.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Embodiments will now be described in detail below with reference to the drawings.

Figure 1:
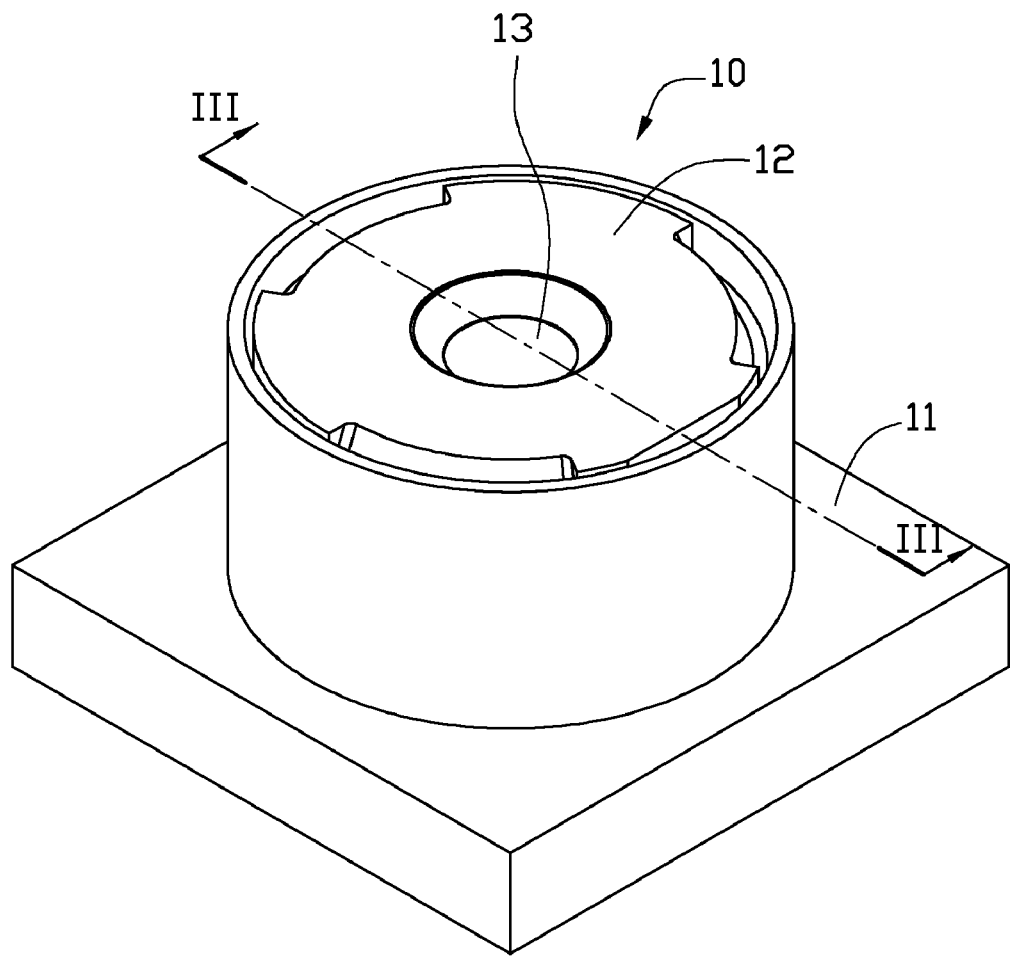
FIG. 1 is a perspective view of a camera module according to an exemplary embodiment.
Figure 2:
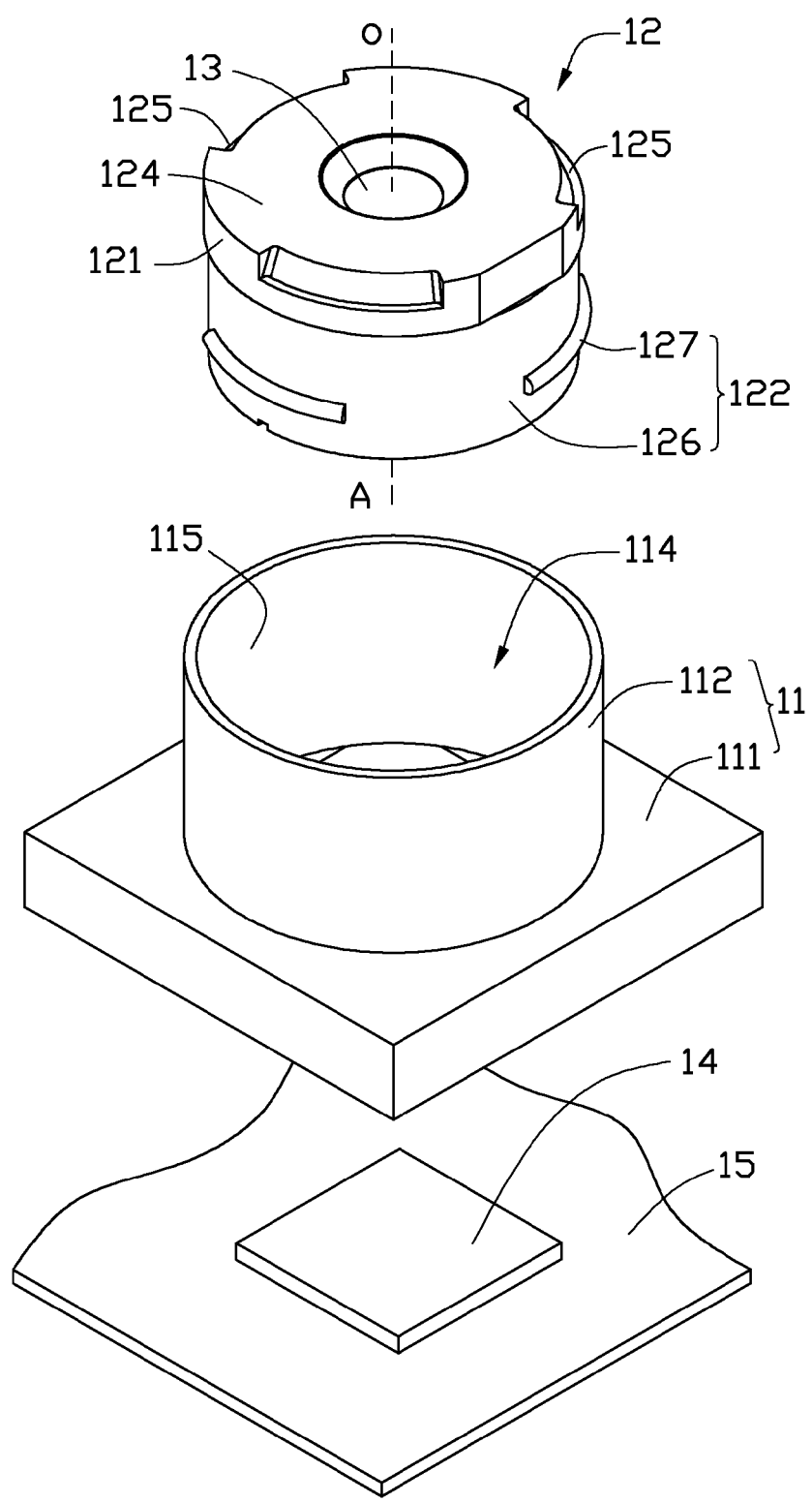
FIG. 2 is an exploded perspective view of the camera module of FIG. 1.
Figure 3:
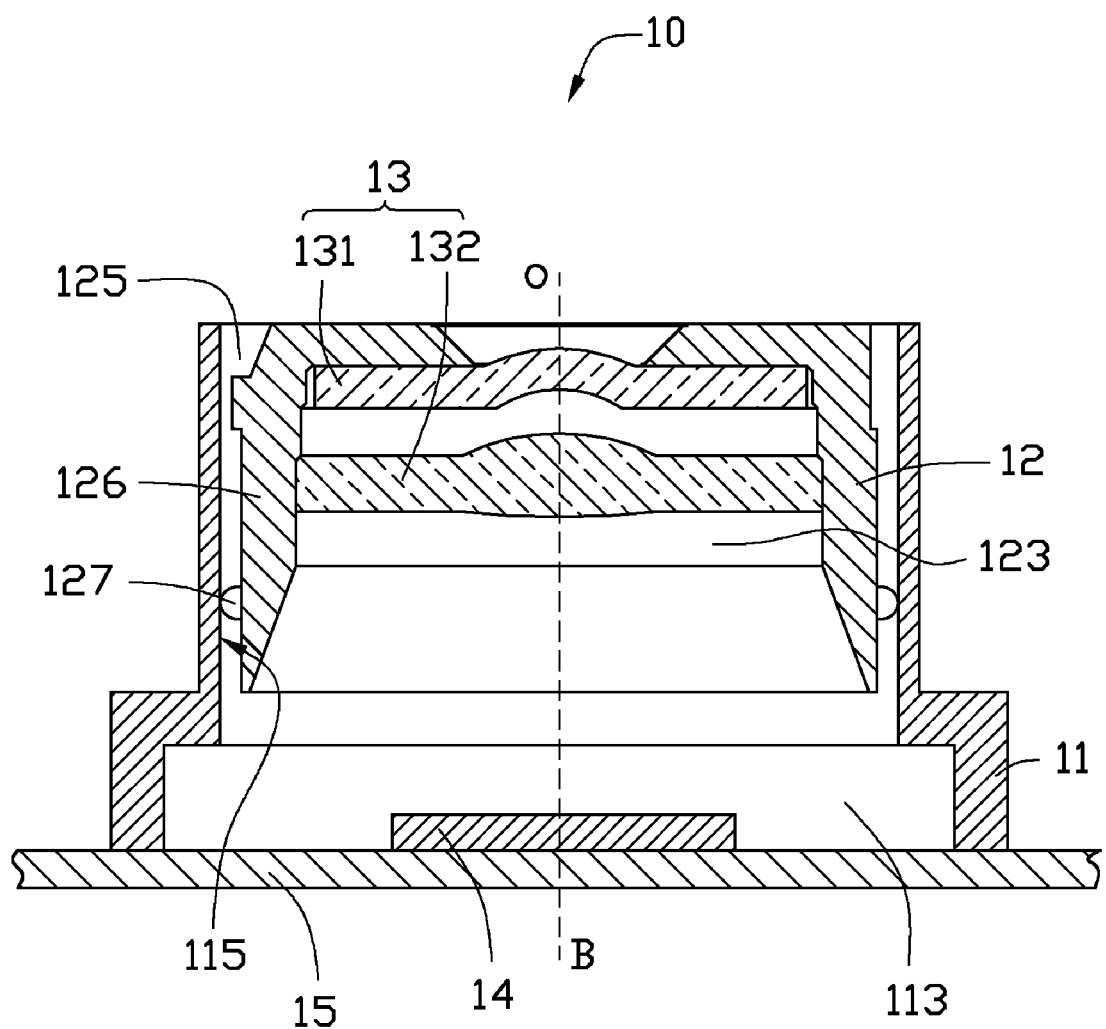
FIG. 3 is a sectional view of the camera module of FIG. 1, taken along the line III-III thereof.

Referring to FIGS. 1-3, a camera module 10 according to an exemplary embodiment is shown. The camera module 10 includes a lens holder 11, a lens barrel 12, and a lens group 13 received in the lens barrel 12, and an image sensor 15, and a circuit board 16 electrically connected to the image sensor 15. In the present embodiment, the lens group 13 includes a first lens 131 and a second lens 132. It is to be understood that lenses of any number and type could be used in the camera module 10.

The lens holder 11 includes a hollow base 111, and a first main body 112 arranged on the hollow base 111. The hollow base 111 defines a receiving cavity 113 for receiving the image sensor 14. The first main body 112 is a hollow body communicating with the hollow base 111. The first main body 112 includes a cylindrical receiving cavity 114 defined therein, and an inner smooth surface 115 in the cylindrical receiving cavity 114. The cylindrical receiving cavity 114 is configured for receiving the lens barrel 12 therein.

The lens barrel 12 is received in the cylindrical receiving cavity 114, and includes a front end 121, and a second main body 122 connected with the front end 121. The lens barrel 12 further defines a receiving cavity 123. The receiving cavity 123 is configured for receiving the lens group 13.

The front end 121 is substantially round, and faces away from the hollow base 111. The front end 121 includes a top surface 124 facing away from the hollow base 111. The top surface 124 defines a plurality of spaced adjusting notches 125 at a periphery thereof. Each adjusting notch 125 is curved, and extends along the circumference of the front end 121. In alternative embodiments, the front end 121 may be any other suitable shape, such as square, triangular, etc. In other alternative embodiments, each adjusting notch 125 may be any other suitable shape, such as square, triangular, etc. In yet still other alternative embodiments, the adjusting notch 125 may instead be different from each other.

The second main body 122 abuts the hollow base 111. The second main body 122 includes a hollow cylinder 126, and a plurality of arc-shaped protrusions 127 evenly arranged on the outer cylindrical surface of the hollow cylinder 126. The outer cylindrical surface of the hollow cylinder 126 is spaced from the inner smooth surface 115. The protrusions 127 abut against the inner smooth surface 115. In the present embodiment, the protrusions 127 are in a common plane perpendicular to the central axis OA of the hollow cylinder 126. The radian of each protrusion 127 is larger than 50 degrees, and smaller than 60 degrees. The size of each protrusion 127 along the central axis OA is in a range from 0.8 millimeters to 1.5 millimeters. The cross section of each protrusion 127 is semicircular. In alternative embodiments, the protrusions 126 may instead be not in a common plane. In other alternative embodiment, the radian of each protrusion 126 may be any other suitable degrees, such 20 degrees, 30 degrees, etc.

It should be noted that in alternative embodiments, the second main body 122 can include only one protrusion 127. In such case, the only one protrusion 127 is a ring, and surrounds the hollow cylinder 126.

The image sensor 14 is mounted on the circuit board 15, and received in the receiving cavity 113. The image sensor 14 is configured for receiving images from the lens group 13 and converting the images into image data.

A method for making the camera module 10 is also provided as follows.

First, the lens holder 11 is mounted on the circuit board 15 having the image sensor 14 mounted thereon, such that the image sensor 14 is received in the receiving cavity 113.

Second, the lens barrel 12 receiving the lens group 13 therein is inserted in the cylindrical receiving cavity 114.

Third, the camera module 10 is measured to check whether the lens group 13 aligns with the image sensor 14. If the misalignment exists, an adjusting member such as a lever (not shown) is inserted into one of the adjusting notches 125 of the lens barrel 12 to adjust the orientation of the lens barrel 12 (e.g., slightly incline the lens barrel 12, relative to the image sensor 14, slightly rotate the lens barrel 12 clockwise or counterclockwise, and so on) until the misalignment is reduced or eliminated. In this way, the misalignment of the camera module 10 can usually be corrected.

Fourth, an adhesive can be applied to the protrusions 127 to securely fix the lens barrel 12 with the lens holder 11.

When an misalignment occurs in the camera module 10, the misalignment is probably reduced or eliminated by using the above method due to the configuration of the camera module 10 (e.g., the adjusting notches 125 in the lens barrel 12 and the protrusions 127 on the outer wall of the lens barrel 12). Accordingly, an imaging quality of the camera module 10 is greatly enhanced.

While certain embodiments have been described and exemplified above, various other embodiments from the foregoing disclosure will be apparent to those skilled in the art. The present disclosure is not limited to the particular embodiments described and exemplified but is capable of considerable variation and modification without departure from the scope and spirit of the appended claims.

What is claimed is:

1. A camera module comprising:
a lens holder comprising a cylindrical receiving cavity defined therein and an inner smooth surface in the cylindrical receiving cavity; and
a lens barrel received in the cylindrical receiving cavity, the lens barrel comprising a hollow cylinder and a plurality of spaced protrusions arranged on the outer cylindrical surface of the hollow cylinder, the protrusions being arc-shaped and the radian of each protrusion being larger than 50 degrees and smaller than 60 degrees, the outer cylindrical surface spaced from the inner smooth surface, the protrusions abutting against the inner smooth surface.

2. The camera module of claim 1, wherein the lens holder comprises a base and a first main body on the base, the cylindrical receiving cavity is defined in the first main body, the lens barrel comprises a front end facing away from the base and a second main body abutting the base, and the second main body comprises the hollow cylinder and the protrusions.

3. The camera module of claim 2, wherein the front end comprises a top surface facing away from the base, and the top surface has an adjusting notch defined at a periphery thereof.

4. The camera module of claim 1, wherein the size of each protrusion along the central axis of the hollow cylinder is in a range from 0.8 millimeters to 1.5 millimeters.

5. The camera module of claim 1, wherein the cross section of each protrusion is semicircular.

6. The camera module of claim 1, wherein the protrusions are in a common plane perpendicular to the central axis of the hollow cylinder.

7. The camera module of claim 6, wherein the protrusions are evenly arranged on the outer cylindrical surface of the hollow cylinder.

8. A camera module comprising:
a lens holder comprising a base and a first main body on the base, the first main body comprising a cylindrical receiving cavity defined therein, and an inner smooth surface in the cylindrical receiving cavity; and
a lens barrel received in the cylindrical receiving cavity, the lens barrel comprising a front end and a second main body connected with the front end, the front end facing away from the base, and having an adjusting notch defined at a periphery thereof, the second main body abutting the base, and comprising a hollow cylinder and a plurality of spaced protrusions arranged on the outer cylindrical surface of the second main body, the size of each protrusion along the central axis of the hollow cylinder being in a range from 0.8 millimeters to 1.5 millimeters, the outer cylindrical surface spaced from the inner smooth surface, the protrusions abutting against the inner smooth surface of the cylindrical receiving cavity.

9. The camera module of claim 8, wherein the protrusions are arc-shaped, and the radian of each protrusion is larger than 50 degrees and smaller than 60 degrees.

10. The camera module of claim 8, wherein the cross section of each protrusion is semicircular.

11. The camera module of claim 8, wherein the protrusions are in a common plane perpendicular to the central axis of the hollow cylinder.

12. The camera module of claim 11, wherein the protrusions are evenly arranged on the outer cylindrical surface of the hollow cylinder.

13. A camera module comprising:
a lens holder comprising a base and a first main body on the base, the first main body comprising a cylindrical receiving cavity defined therein, and an inner smooth surface in the cylindrical receiving cavity; and
a lens barrel received in the cylindrical receiving cavity, the lens barrel comprising a front end and a second main body connected with the front end, the front end having a top surface facing away from the base, the lens barrel having a plurality of adjusting notches defined in the top surface at a periphery of the front end, the second main body abutting the base, and comprising a hollow cylinder and a plurality of spaced protrusions arranged on the outer cylindrical surface of the hollow cylinder, the outer cylindrical surface spaced from the inner smooth surface, the protrusions being in a common plane perpendicular to the central axis of the hollow cylinder, and being spaced from the adjusting notches along a direction parallel with the central axis of the lens barrel, and abutting against the inner smooth surface, the protrusions being arc-shaped, and the radian of each protrusion being larger than 50 degrees and smaller than 60 degrees.

14. The camera module of claim 13, wherein the cross section of each protrusion is semicircular.

15. The camera module of claim 13, wherein the size of each protrusion along the central axis of the hollow cylinder is in a range from 0.8 millimeters to 1.5 millimeters.

16. The camera module of claim 3, wherein the adjusting notch is defined in the top surface.

17. The camera module of claim 16, wherein the adjusting notch is spaced from the protrusions.

18. The camera module of claim 8, wherein the adjusting notch is defined in the top surface.

19. The camera module of claim 18, wherein the adjusting notch is spaced from the protrusions.

* * * * *